(12) United States Patent
Hoflehner et al.

(10) Patent No.: US 7,398,521 B2
(45) Date of Patent: Jul. 8, 2008

(54) METHODS AND APPARATUSES FOR THREAD MANAGEMENT OF MULTI-THREADING

(75) Inventors: Gerolf F. Hoflehner, Santa Clara, CA (US); Shih-wei Liao, San Jose, CA (US); Xinmin Tian, Union City, CA (US); Hong Wang, Fremont, CA (US); Daniel M. Lavery, Santa Clara, CA (US); Perry Wang, San Jose, CA (US); Dongkeun Kim, San Jose, CA (US); Milind Girkar, Sunnyvale, CA (US); John P. Shen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 814 days.

(21) Appl. No.: 10/779,193

(22) Filed: Feb. 13, 2004

(65) Prior Publication Data

US 2005/0081207 A1      Apr. 14, 2005

Related U.S. Application Data

(63) Continuation-in-part of application No. 10/676,581, filed on Sep. 30, 2003.

(51) Int. Cl.
*G06F 9/45* (2006.01)
(52) U.S. Cl. ...................................... 717/151
(58) Field of Classification Search ................ 717/151
See application file for complete search history.

(56) References Cited

U.S. PATENT DOCUMENTS

| 6,233,599 | B1 * | 5/2001 | Nation et al. ............... 718/102 |
| 6,363,410 | B1 * | 3/2002 | Kanamori et al. ........... 718/104 |
| 6,567,839 | B1 * | 5/2003 | Borkenhagen et al. ...... 718/103 |
| 7,036,124 | B1 * | 4/2006 | Patterson ..................... 718/104 |
| 2004/0194094 | A1 * | 9/2004 | Qui et al. ..................... 718/100 |
| 2005/0071841 | A1 * | 3/2005 | Hoflehner et al. ........... 718/100 |

OTHER PUBLICATIONS

PCT Search Report, International Application No. PCT/US2004/032075, Filing date Sep. 29, 2004, mailed Jan. 10, 2005 (6 pages).
PCT Written Opinion, International Application No. PCT/US2004/032075, Filing date Sep. 29, 2004, mailed Jan. 10, 2005 (7 pages).

(Continued)

*Primary Examiner*—John Chavis
(74) *Attorney, Agent, or Firm*—Blakely, Sokoloff, Taylor & Zafman LLP

(57) ABSTRACT

Methods and apparatuses for thread management for multi-threading are described herein. In one embodiment, exemplary process includes selecting, during a compilation of code having one or more threads executable in a data processing system, a current thread having a most bottom order, determining resources allocated to one or more child threads spawned from the current thread, and allocating resources for the current thread in consideration of the resources allocated to the current thread's one or more child threads to avoid resource conflicts between the current thread and its one or more child threads. Other methods and apparatuses are also described.

14 Claims, 6 Drawing Sheets

OTHER PUBLICATIONS

Mulder, J. M., "Inter: An Inexpensive Inter-Procedural Register Allocator" Microprocessing and Microprogramming, Elsevier Science Publishers, BV, Amsterdam, NL, vol. 27, No. 1/5, Aug. 1989, pp. 95-100.

Steenkiste, Peter A. et al., "A Simple Interprocedural Register Allocation Algorithm and Its Effectiveness for LISP", ACM Transactions on Programming Languages and Systems, New York, NY, vol. 11, No. 1, Jan. 1989, pp. 1-32.

Luk, Chi-Keung, "Tolerating Memory Latency through Software-Controlled Pre-Execution in Simultaneous Multithreading Processors", Proceedings of the 28th International Symposium on Computer Architecture, (ISCA, Jun. 2001) Goteborg, Sweden, IEEE, pp. 40-51.

Kim, Dongkeun et al., "Design and Evaluation of Compiler Algorithms for Pre-Execution" Proceedings of the 10th International Conference on Architectural Support for Programming Languages and Operating Systems, Oct. 2002, San Jose, CA, USA, pp. 159-170.

* cited by examiner

300

```
FOREACH THREAD CHAIN
    FOREACH THREAD IN BOTTOM UP ORDER
        READ_RESOURCE_TABLE_FOR_CHILDREN_THREAD();   ⎫
        PREALLOCATE_REGISTERS();                      ⎬ 301
        ALLOCATE_REMAINING_REGISTERS();               ⎪
        WRITE_RESOURCE_TABLE ();                      ⎭
    ENDFOR
ENDFOR

FOR MAIN THREAD DO
    READ_RESOURCE_TABLE_FOR_CHILDREN_THREAD_AT_EACH_SPAWN();   ⎫
    PREALLOCATE_REGISTERS();                                    ⎬ 302
    ALLOCATE_REMAINING_REGISTERS();                             ⎭
DONE
```

| Thread ID 401 | Written Resources 402 | Live-in Resources 403 |
|---|---|---|
| Helper Thread 2 | R4, R5 | (v5, R2)<br>(v6, R3) |
| Helper Thread 1 | R2, R3, R4,<br>R5, R8 | (v3, R5)<br>(v4, R6) |
| Helper Thread 3 | . . . | . . . |
| ... | . . . | . . . |
| Helper Thread n | . . . | . . . |
| Main Thread | . . . | . . . |

Fig. 4

METHODS AND APPARATUSES FOR THREAD MANAGEMENT OF MULTI-THREADING

RELATED APPLICATIONS

This application is a continuation-in-part (CIP) of U.S. patent application Ser. No. 10/676,581, filed Sep. 30, 2003, which is hereby incorporated by reference.

FIELD

Embodiments of the invention relate to information processing system; and more specifically, to thread management for multi-threading.

BACKGROUND

Memory latency has become the critical bottleneck to achieving high performance on modern processors. Many large applications today are memory intensive, because their memory access patterns are difficult to predict and their working sets are becoming quite large. With the advent of multi-threading technology such as Simultaneous Multi-Threading (SMT) architecture feature available in a processor, such as Intel Pentium® 4 processor with Hyper-Threading technology or Chip-multiprocessor (CMP), to leverage the emerging multithreading techniques, a set of new techniques has been introduced, including new compiler transformation for generating efficient helper thread code to parallelize single-threaded applications in a way to run on multithreading machine, such as a machine having SMT architectures based on helper thread technology for speculative multithreading that are geared towards adaptive data prefetching. In a typical system, a thread switch has to save and restore a fixed amount of registers, which may waste register resources.

BRIEF DESCRIPTION OF THE DRAWINGS

The invention may best be understood by referring to the following description and accompanying drawings that are used to illustrate embodiments of the invention. In the drawings:

FIG. 3 is a block diagram illustrating an exemplary pseudo code for allocating resources for the threads according to one embodiment.

FIG. 4 is a block diagram illustrating an exemplary resource data structure containing resource information for the threads according to one embodiment.

DETAILED DESCRIPTION

Figure 1:
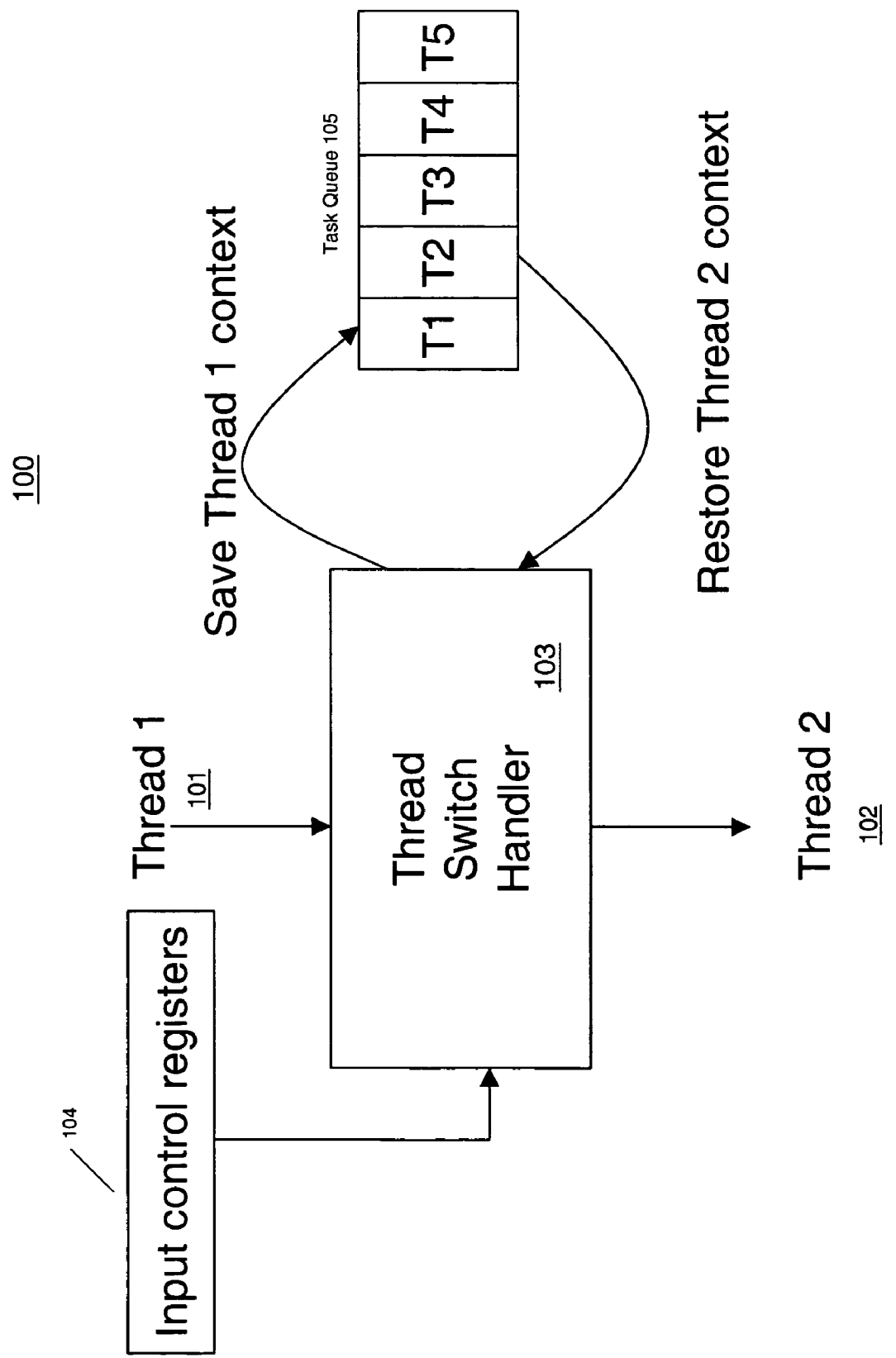
FIG. 1 illustrates an exemplary thread process according to one embodiment.

Methods and apparatuses for thread management for multithreading are described. According to one embodiment, hardware resources, such as register contexts may be managed for helper threads within a compiler. The register set may be statically or dynamically partitioned between a main thread and one or more helper threads, and between multiple helper threads. In one embodiment, the live-in/live-out register copies via memory for threads may be avoided and the threads may be destroyed at compile time, when the compiler runs out of resources, or at runtime when infrequent cases of certain main thread events occur.

In one embodiment, the compiler may visit the helper threads in a bottom-up walk and communicates the resource utilization in a resource data structure or table. The parent helper thread, which may be the main thread, utilizes this information and ensures that its resources do not overlap with the thread resources. When the thread resources penalize the main execution thread, for example, by forcing the main thread to spill/fill registers, the compiler may terminate previously created threads.

In the following description, numerous specific details are set forth. However, it is understood that embodiments of the invention may be practiced without these specific details. In other instances, well-known circuits, structures and techniques have not been shown in detail in order not to obscure the understanding of this description.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

Embodiments of the present invention also relate to apparatuses for performing the operations described herein. An apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as Dynamic RAM (DRAM), erasable programmable ROMs (EPROMs), electrically erasable programmable ROMs (EEPROMs), magnetic or optical cards, or any type of media suitable for storing electronic instructions, and each of the above storage components is coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods. The structure for a variety of these systems will appear from the description below. In addition, embodiments of the present invention are not described with reference to any particular programming language. It will be appreciated that a variety of programming languages may be used to implement the teachings of the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram illustrating an exemplary processor which may bed used to execute one or more helper threads created by a compiler according to one embodiment. Referring to FIG. 1, according to one embodiment, exemplary processor 100 includes a task queue 105 to store thread contexts when thread switch handler 103 switches from one thread to another. One or more input control registers 104 may be used to control what is stored in task queue 105. For example, referring to FIG. 1, when thread switch handler 103 switches from thread 101 to thread 102, the context of thread 101 is saved in task queue 105 and the context of thread 102 is restored from task queue 105 before switching to thread 102. With the help of the compiler, minimal thread context, such as instruction pointer (IP), may be required to be stored in task queue 105. The remainder of the thread context information may be handled by the compiler.

Figure 2:
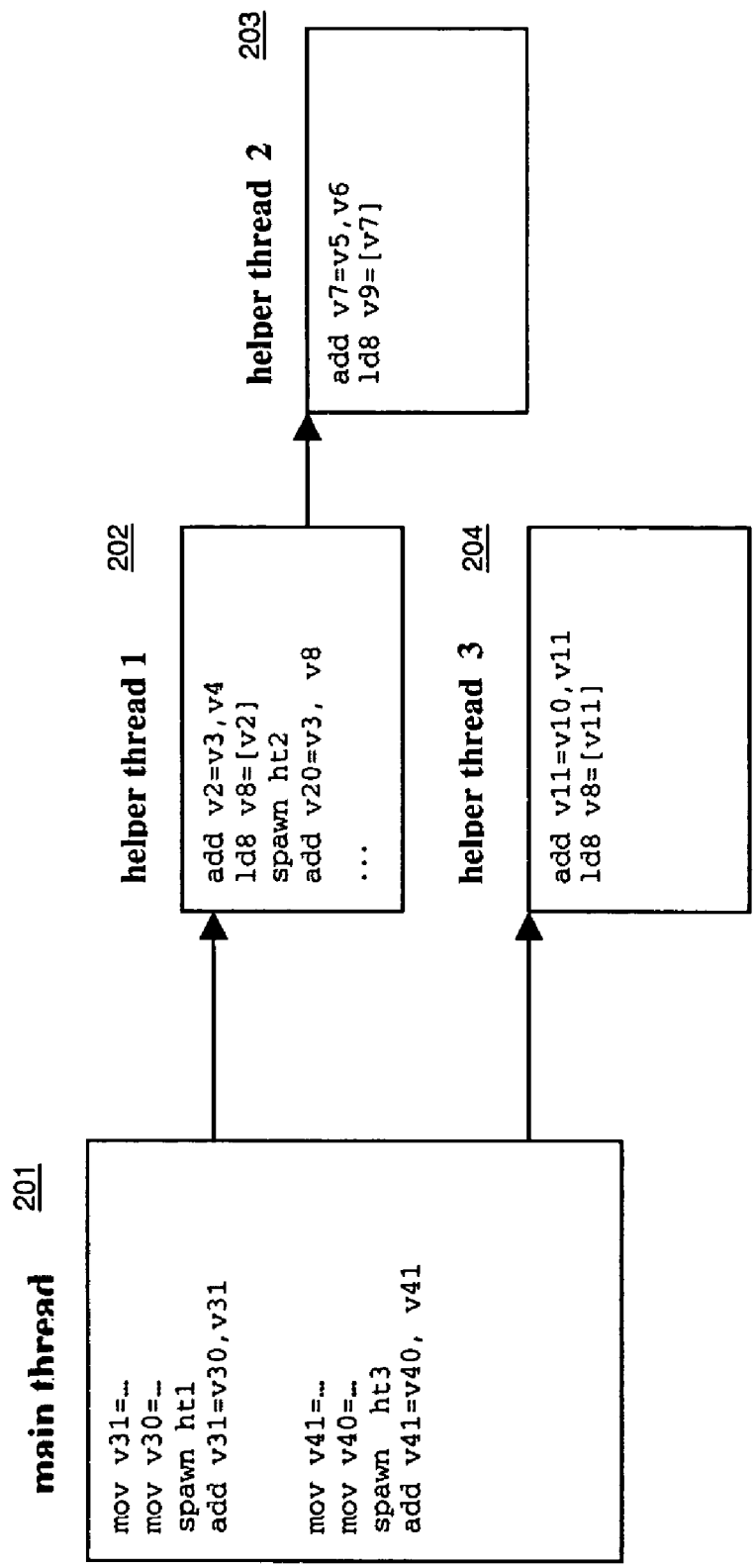
FIG. 2 is a block diagram illustrating an exemplary thread configuration according to one embodiment.

FIG. 2 is a block diagram illustrating an exemplary configuration of threads according to one embodiment. In this embodiment, exemplary configuration 200 includes a main thread 201 (e.g., a parent thread) and three helper threads (e.g., child threads) 202-204, which may be spawned from the main thread 201, while thread 203 may be spawned from thread 202 (e.g., helper thread 202 is a parent thread of helper thread 203). It will be appreciated that the helper threads are not limited to three helper threads, more or less helper threads may be included. The helper threads may be spawned by a spawn instruction and the thread execution may resume after the spawn instruction.

According to one embodiment, the compiler creates the threads in the thread creation phase and allocates resources for the threads in a subsequent thread resource allocation phase. Dynamically and typically, a helper thread is spawned when its parent thread stalls. Exemplary configuration 200 may happen during a page fault or a level 3 (L3) cache miss.

It is important that a thread can only share incoming registers (or resources in general) with a parent thread. For example, referring to FIG. 2, when main thread 201 needs a register, it may write a value to register R10 before it spawns helper thread 202 and uses register R10 after the helper thread 202 terminates. Neither the helper thread 202 nor any of its children (in the example, helper thread 203 is the only children of helper thread 202, and helper threads 202 and 204 are children of the main thread 201) may write to register R10. Otherwise they would destroy the value in the main thread 201. This would result in incorrect program execution. To avoid this resource conflict, according to one embodiment, the compiler may partition the resources statically or dynamically.

According to one embodiment, the compiler allocates resources for the helper threads and the main thread in a bottom-up order. FIG. 3 is a block diagram illustrating an exemplary pseudo code for allocating resources for the threads according to one embodiment. That is, in the exemplary algorithm 300, the compiler allocates all resources for the helper threads in a bottom-up order (block 301) and thereafter allocates resources for the main thread (block 302) based on the resources used by the helper threads to avoid resource conflicts.

For the purposes of illustration, the resources used by the threads are assumed to be the hardware registers. However, similar concepts may be applied to other resources apparent to one with ordinary skill in the art, such as memory or interrupt. Referring to FIG. 2, the compiler partitions the registers dynamically by walking bottom up from the lead thread of a thread chain. In this example, helper thread 203 is a leaf thread in the first thread chain including helper thread 202. Helper thread 204 is a leaf thread in the second thread chain. The compiler records the register allocation in each helper thread in a data structure, such as a resource table similar to the exemplary resource table 400 of FIG. 4. Then the parent thread reads the resource allocation of its children thread and does its allocation and reports it in its resource table.

FIG. 4 is a block diagram illustrating an exemplary resource data structure according to one embodiment. Exemplary data structure 400 may be implemented as a table stored in a memory and accessible by a compiler. Alternatively, exemplary data structure 400 may be implemented in a database. In one embodiment, exemplary data structure 400 includes, but not limited to, written resources 402 and live-in resources used by the respective thread identified via thread ID 401. Other configurations may exist.

Referring to FIGS. 2 and 4, according to one embodiment, at the beginning, the registers of helper thread 203 (e.g., the thread having the most bottom order in a bottom-up scheme) are allocated. The live-in values are v5 and v6 and assuming they are assigned to registers R2 and R3 respectively. Also, v7 gets register R4 assigned and v9 gets register R5 assigned. The resource table for helper thread 203 includes live-in=((v5, R2), (v6, R3)) and register written=(R4, R5), as shown in FIG. 4. In helper thread 202, the compiler replaces v2 with R2 and v8 with R3, as v2 and v8 are the parameters for helper thread 203. It also marks registers R4 and R5 (written in helper thead 203) as live at the spawn point of helper thread 203 and thus prevents a resource conflict between helper thread 202 and helper thread 203. For helper thread 202, the live-in values are v3 and v4 and are assigned to register R6 and R7 respectively. When v20 in helper thread 202 is assigned to register R8, the resource table for the helper thread 202 includes live_in=((v3, R6), (v4, R7)) and written registers=(R2, R3, R4, R5, R6, R7, R8), as shown in FIG. 4. The written registers are the live-in registers for helper thread 203 (e.g., R2 and R3), the written registers in helper thread 203 (e.g., R4 and R5), and the registers written in helper thread 202 (e.g., R8). Then the compiler allocates the registers for helper thread 204. When the registers are allocated for all the helper threads, it allocates the registers for the main thread 201.

In addition, according to one embodiment, when the compiler runs out of registers, it can delete one or more helper threads within the chain. This can happen for example, when the main thread runs out of registers, because the helper thread chain is too deep or a single helper thread needs too many registers and the main thread has to spill/fill registers. The compiler can apply heuristics to either allow certain number of spills or delete the entire helper thread chain or some threads in the thread chain. An alternative to deleting helper thread is to explicitly configure the weight of context save/restore, so that upon context switch, the parent's live registers that could be written by the helper thread's execution can be saved automatically by the hardware. Even though this context switch is relatively expensive, potentially such case is infrequent case. Moreover, such fine-grain context switch is still of much low overhead compared to full-context switch as used in most OS-enabled thread switch or a traditional hardware based full-context thread switch.

Furthermore, when there is a conflict for live-in registers, for example, if helper thread 203 overwrote a live-in register (e.g., mov v5= . . . ) and this register is also used in helper thread 202 after the spawn of helper thread 203, there would be a resource conflict for the register assigned to v5 (in this example, register R2). To handle this information, the compiler would use availability analysis and insert compensation code, such as inserting a mov v5'=v5 instruction before spawning helper thread 203 and replacing v5 by v5' after the spawn.

Figure 5:
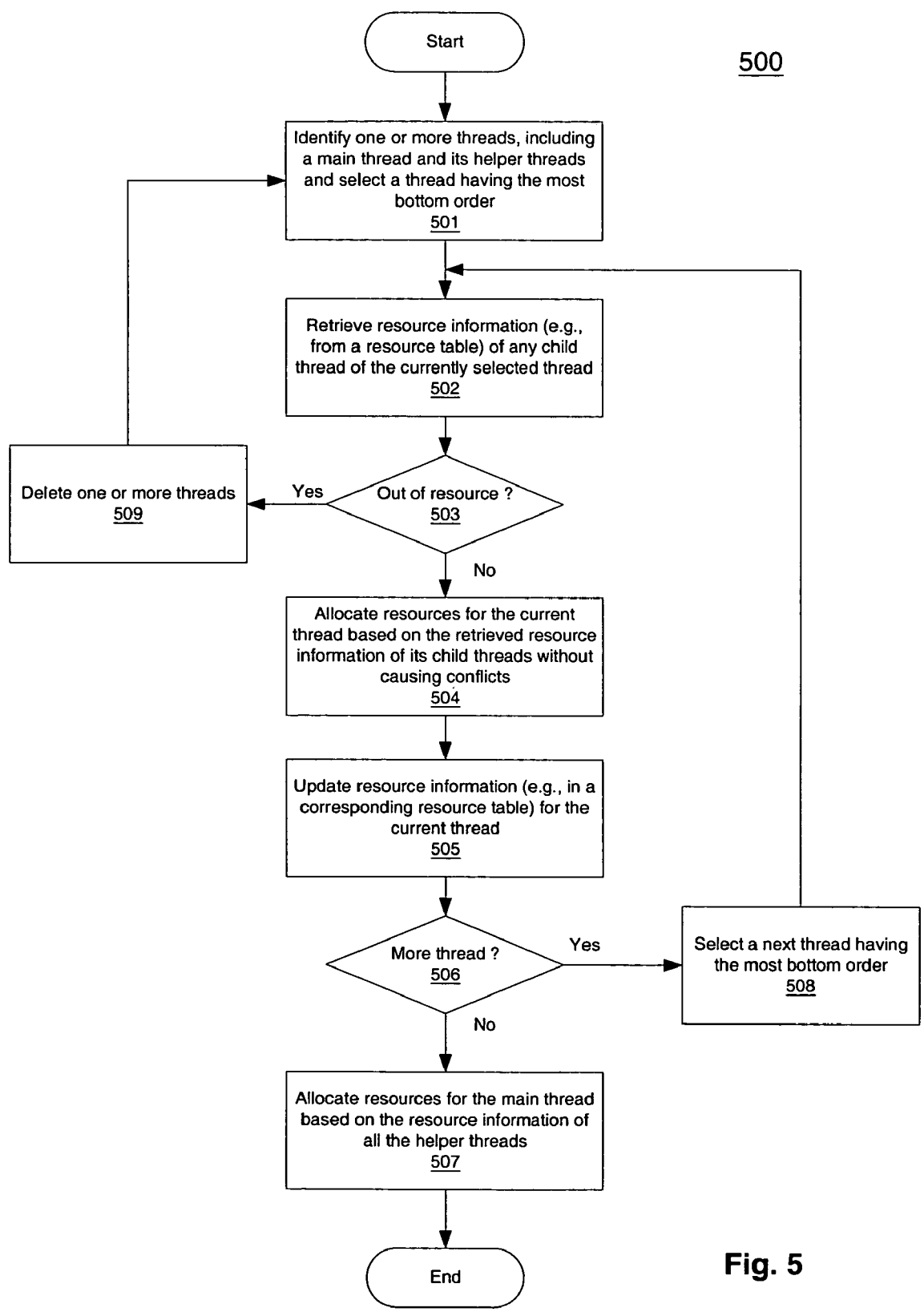
FIG. 5 is a flow diagram illustrating an exemplary process for allocating resources for threads according to one embodiment.

FIG. 5 is a flow diagram illustrating an exemplary process for allocating resources for threads according to one embodiment. Exemplary process 500 may be performed by a processing logic that may comprise hardware (circuitry, dedicated logic, etc.), software (such as is run on a general purpose computer system or a dedicated machine), or a combination of both. In one embodiment, exemplary process 500 includes creating, automatically during a compilation of code, one or more threads executable in a data processing system, resulting in a thread tree potentially for at least one function in the code, selecting a current thread by traversing the thread tree in a bottom-up order that ensures that all child threads of the current thread had been selected before, determining resources allocated to one or more child threads spawned from the current thread, and allocating resources for the current thread in consideration of the resources allocated to the current thread's one or more child threads to avoid resource conflicts between the current thread and its one or more child threads.

Referring to FIG. 5, at block 501, processing logic identifies one or more threads, including a main thread and its helper threads, and selects a thread having the most bottom order as a current thread. The threads may be identified using a thread dependency graph created during the thread creation phase of the compilation. At block 502, the processing logic retrieves resource information of any child thread, which may be spawned from the current thread. The resources information may be obtained from a data structure corresponding to the child threads, such as resource table 400 of FIG. 4. At block 503, if there is no more resources available, the processing logic may delete one or more threads from the chain and restart over again (block 509). If there is more resource available, at block 504, the processing logic allocates resources for the current thread in consideration of resources used by its child threads without causing resource conflicts. Thereafter, at block 505, the processing logic updates the resources allocated to the current thread in the associated resource table, such as resource table 400 of FIG. 4. The above processes continue until no more helper threads (e.g., child threads of the main thread) remained (blocks 506 and 508). Finally, at block 507, the processing logic allocates resources for the main thread (e.g., a parent thread for all helper threads) based on the resource information of all the helper threads without causing resource conflicts. Other operations may be included.

Figure 6:
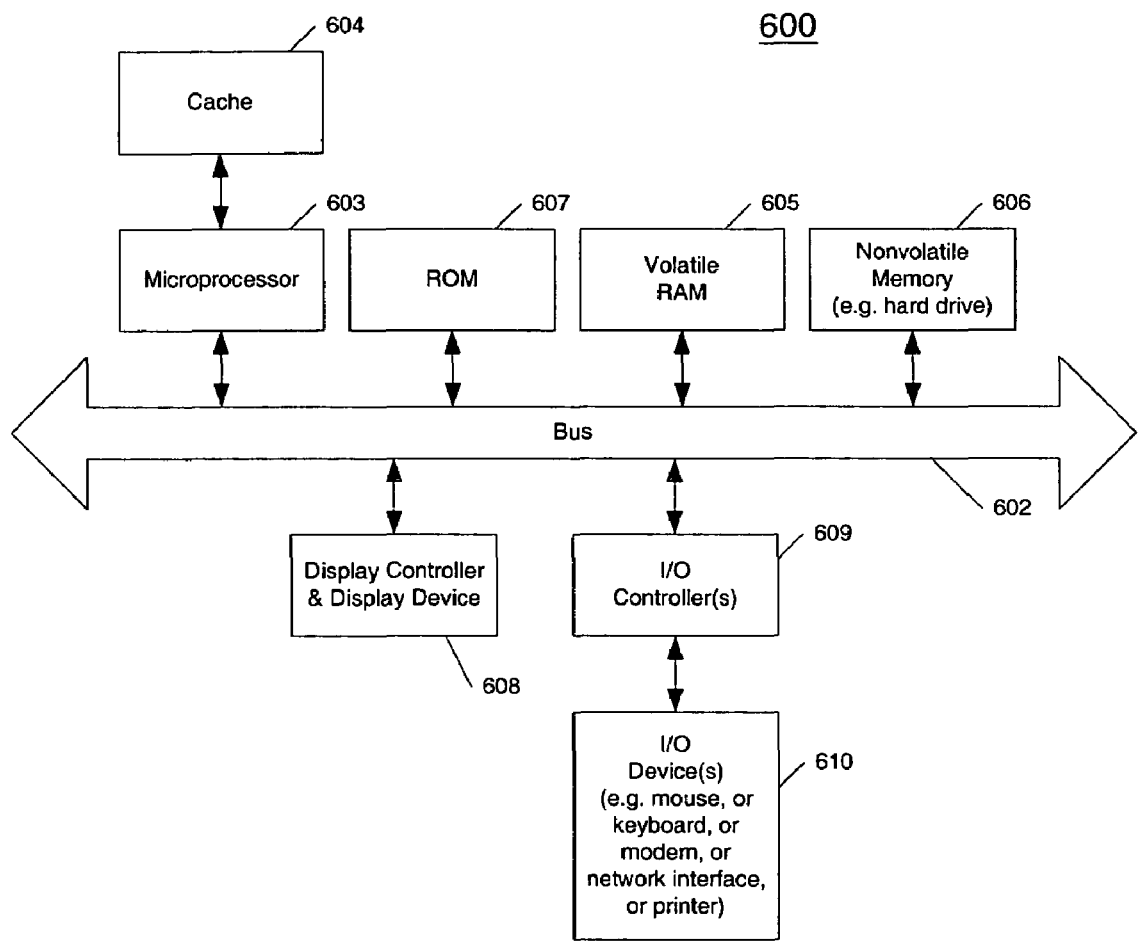
FIG. 6 illustrates a computer system having multi-threading capability according to one embodiment.

FIG. 6 is a block diagram of an exemplary computer which may be used with an embodiment. For example, exemplary system 600 shown in FIG. 6 may be a virtual multithreading (VMT), a SMT, or a CMP enabled system. Note that while FIG. 6 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention.

As shown in FIG. 6, the computer system 600, which is a form of a data processing system, includes a bus 602 which is coupled to a microprocessor 603 and a ROM 607, a volatile RAM 605, and a non-volatile memory 606. The microprocessor 603, which may be a Pentium processor from Intel Corporation or a PowerPC processor from Motorola, Inc., is coupled to cache memory 604 as shown in the example of FIG. 6. The bus 602 interconnects these various components together and also interconnects these components 603, 607, 605, and 606 to a display controller and display device 608, as well as to input/output (I/O) devices 610, which may be mice, keyboards, modems, network interfaces, printers, and other devices which are well-known in the art. Typically, the input/output devices 610 are coupled to the system through input/output controllers 609. The volatile RAM 605 is typically implemented as dynamic RAM (DRAM) which requires power continuously in order to refresh or maintain the data in the memory. The non-volatile memory 606 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 6 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 602 may include one or more buses connected to each other through various bridges, controllers, and/or adapters, as is well-known in the art. In one embodiment, the I/O controller 609 includes a USB (Universal Serial Bus) adapter for controlling USB peripherals or a PCI controller for controlling PCI devices, which may be included in IO devices 610. In a further embodiment, I/O controller 609 includes an IEEE-1394 controller for controlling IEEE-1394 devices, also known as FireWire devices.

According to one embodiment, processor 603 may be a VMT enabled single uniprocessor that, with the helper of compiler, handles multiple threads substantially simultaneously, including a main thread, also referred to as a non-speculative thread, and one or more helper threads, also referred to as speculative threads, of an application. During an execution of an application, a main thread and one or more helper threads are executed in parallel. The helper threads are speculatively executed associated with, but somewhat independent to, the main thread to perform some precomputations, such as speculative prefetches of addresses or data, for the main thread to reduce the memory latency incurred by the main thread.

According to one embodiment, the code of the helper threads (e.g., the source code and the binary executable code) are generated by a compiler, loaded and executed in a memory, such as volatile RAM 605, by a processor, such as processor 603. The operating system running within the exemplary system 600 may be a Windows operating system from Microsoft Corporation or a Mac OS from Apple Computer. Alternatively, the operating system may be a Linux or Unix operating system. Other operating systems, such as embedded real-time operating systems, may be utilized.

Thus, methods and apparatuses for thread management for multi-threading have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
   creating, automatically during a compilation of code, a plurality of threads executable in a processor of a data processing system, resulting in a thread tree potentially for at least one function in the code, wherein the thread tree represents a thread dependency graph of the plurality of threads;
   selecting a current thread by traversing the thread tree in a bottom-up order that ensures that all child threads of the current thread had been selected before selecting the current thread as a parent thread;
   determining resources allocated to one or more child threads spawned from the current thread; and
   allocating resources for the current thread in consideration of the resources allocated to the current thread's one or more child threads to avoid resource conflicts between the current thread and its one or more child threads,
   wherein the allocated resources include one or move hardware registers and physical memory associated with the processor used by each of the plurality of threads, and
   wherein the resources allocated to the one or more child threads are recorded in a data structure maintained by a compiler of the Compilation to enable the compiler a avoid the resource conflicts between the current thread and the one or more child threads such that the processor performs less resource management actions during executing the plurality of the threads by the processor.

2. The method of claim 1, further comprising updating resource information in a data structure regarding the resources allocated to the current thread, the data structure being accessible by a parent thread of the current thread.

3. The method of claim 1, further comprising repeating the selecting, determining, and allocating in a bottom-up order until each of the one or more threads has been processed.

4. The method of claim 3, further comprising allocate resources for a main thread that is a parent thread of the one or more threads after each of the one or more threads has been processed, the resources of the main thread are allocated in view of resources allocated to the one or more threads.

5. The method of claim 1, further comprising:
   determining whether there are resources remaining in the data processing system prior to the allocating the resources for the current thread; and
   deleting at least one child thread of the current thread; and
   allocating the resources for the current thread using the resources associated with the at least one deleted child thread.

6. A machine-readable storage medium having executable code to cause a machine to perform a method, the method comprising:
   creating, automatically during a compilation of code, a plurality of threads executable in a processor of a data processing system, resulting in a thread tree potentially for at least one function in the code, wherein the thread tree represents a thread dependency mph of the plurality of threads;
   selecting a current thread by traversing the thread tree in a bottom-up order that ensures that all child threads of the current thread had been selected before selecting the current thread as a parent thread;
   determining resources allocated to one or more child threads spawned from the current thread; and
   allocating resources for the current thread in consideration of the resources allocated to the current thread's one or more child threads to avoid resource conflicts between the current thread and its one or more child threads,
   wherein the allocated resources include one or more hardware registers and physical memory associated with the processor used by each of the plurality of threads, and
   wherein the resources allocated to the one or more child threads are recorded in a data structure maintained by a compiler of the compilation to enable the compiler to avoid the resource conflicts between the current thread and the one or more child threads such that the processor performs less resource management actions during executing the plurality of the threads by the processor.

7. The machine-readable storage medium of claim 6, wherein the method further comprises updating resource information in a data structure regarding the resources allocated to the current thread, the data structure being accessible by a parent thread of the current thread.

8. The machine-readable storage medium of claim 6, wherein the method further comprises repeating the selecting, determining, and allocating in a bottom-up order until each of the one or more threads has been processed.

9. The machine-readable storage medium of claim 8, wherein the method further comprises allocating resources for a main thread that is a parent thread of the one or more threads after each of the one or more threads has been processed, the resources of the main thread are allocated in view of resources allocated to the one or more threads.

10. The machine-readable storage medium of claim 6, wherein the method further comprises:
    determining whether there are resources remaining in the data processing system prior to the allocating the resources for the current thread; and
    deleting at least one child thread of the current thread; and
    allocating the resources for the current thread using the resources associated with the at least one deleted child thread.

11. A data processing system, comprising:
    a processor capable of performing multi-threading operations;
    a memory coupled to the processor; and
    a process executed by the processor from the memory to cause the processor to
    create, automatically during a compilation of code, a plurality of threads executable in a processor of a data processing system, resulting in a thread tree potentially for at least one function in the code, wherein the thread tree represents a thread dependency graph of the plurality of threads;
    select a current thread by traversing the thread tree in a bottom-up order that ensures that all child threads of the current thread had been selected before selecting the current thread as a parent thread;

determine resources allocated to one or more child threads spawned from the current thread; and allocate resources for the current thread in consideration of the resources allocated to the current thread's one or more child threads to avoid resource conflicts between the current thread and its one or more child threads, wherein the allocated resources include one or more hardware registers and physical memory associated with the processor used by each of the plurality of threads, and wherein the resources allocated to the one or more child threads are recorded in a data structure maintained by a compiler of the compilation to enable the compiler to avoid the resource conflicts between the current thread and the one or more child threads such that the processor perform less resource management actions during executing the plurality of the threads by the processor.

12. The data processing system of claim 11, wherein the process further causes the processor to repeat the selecting, determining, and allocating in a bottom-up order until each of the one or more threads has been processed.

13. The data processing system of claim 12, wherein the process further causes the processor to allocate resources for a main thread that is a parent thread of the one or more threads after each of the one or more threads has been processed, the resources of the main thread are allocated in view of resources allocated to the one or more threads.

14. The data processing system of claim 11, wherein the process further causes the processor to:

determine whether there are resources remaining in the data processing system prior to the allocating the resources for the current thread; and delete at least one child thread of the current thread; and allocate the resources for the current thread using the resources associated with the at least one deleted child thread.

* * * * *